(12) United States Patent
Roy et al.

(10) Patent No.: US 11,628,817 B2
(45) Date of Patent: Apr. 18, 2023

(54) TORQUE CONTROL SYSTEM FOR A VEHICLE POWERPLANT

(71) Applicant: FORD GLOBAL TECHNOLOGIES, LLC, Dearborn, MI (US)

(72) Inventors: Judhajit Roy, Royal Oak, MI (US); Maruthi Thiruninravur Ravichandran, Hamilton (CA); Jason Meyer, Canton, MI (US); Rajit Johri, Canton, MI (US); Jeffrey Allen Doering, Canton, MI (US); Yanan Zhao, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 226 days.

(21) Appl. No.: 16/876,841

(22) Filed: May 18, 2020

(65) Prior Publication Data

US 2021/0354681 A1 Nov. 18, 2021

(51) Int. Cl.
*B60W 10/02* (2006.01)
*F16H 45/02* (2006.01)
*B60K 23/06* (2006.01)

(52) U.S. Cl.
CPC .......... *B60W 10/024* (2020.02); *B60K 23/06* (2013.01); *F16H 45/02* (2013.01); *B60W 2510/0609* (2013.01); *B60W 2720/30* (2013.01); *F16H 2312/02* (2013.01)

(58) Field of Classification Search
CPC ..... B60W 2510/0609; B60W 2720/30; B60W 10/024; B60W 10/0235; F16H 45/02; F16H 2312/02; B60K 23/06
See application file for complete search history.

(56) References Cited

U.S. PATENT DOCUMENTS

| | | | | |
|---|---|---|---|---|
| 7,286,922 | B1* | 10/2007 | Fischer | F16H 61/143 701/87 |
| 2015/0197252 | A1* | 7/2015 | Tinker | B60W 10/06 477/54 |
| 2016/0375893 | A1 | 12/2016 | Nefcy et al. | |
| 2018/0050684 | A1* | 2/2018 | Meyer | B60K 6/48 |
| 2018/0265087 | A1* | 9/2018 | Tohta | F16H 63/50 |
| 2018/0354493 | A1 | 12/2018 | Johri et al. | |

* cited by examiner

*Primary Examiner* — Tisha D Lewis
(74) *Attorney, Agent, or Firm* — David B Kelley; Brooks Kushman P.C.

(57) ABSTRACT

A vehicle includes a drive wheel, an engine, an accelerator pedal, a torque converter, a clutch, and a controller. The drive wheel is configured to propel the vehicle. The engine is configured to generate power and to deliver power to the drive wheel to accelerate the vehicle. The accelerator pedal is configured to generate an acceleration request based on a pedal position. The torque converter is disposed between the engine and the drive wheel. The clutch is disposed between the engine and the drive wheel and is configured to bypass the torque converter. The controller is programmed to, in response to depressing the accelerator pedal to a position that corresponds with accelerating the vehicle at a desired magnitude, adjust the torque of the engine to accelerate the vehicle at the desired magnitude, regardless of the state of the clutch.

17 Claims, 4 Drawing Sheets

TORQUE CONTROL SYSTEM FOR A VEHICLE POWERPLANT

TECHNICAL FIELD

The present disclosure relates to control systems for vehicles and power generating devices for propelling vehicles.

BACKGROUND

Vehicles may include power generating devices that are configured to propel the vehicle, such as an engine or an electric motor.

SUMMARY

A vehicle includes at least one drive wheel, a torque converter, a torque converter bypass clutch, a powerplant, a drivetrain, and a controller. The at least one drive wheel is configured to propel the vehicle. The torque converter has an impeller and a turbine. The torque converter bypass clutch is configured to transition between an opened stated, a closed state, and a slipping state. Rotation of the impeller and the turbine are synchronized when the torque converter bypass clutch is in the closed state. Rotation of the impeller and the turbine are non-synchronized when the torque converter bypass clutch is in the opened state or the slipping state. The powerplant is configured to generate torque and to transfer torque to the torque converter and the torque converter bypass clutch. The drivetrain is configured to transfer power from the torque converter and the torque converter bypass clutch to the at least one drive wheel. The controller is programmed to, in response to a request to accelerate the vehicle at a desired magnitude and the torque converter bypass clutch being in the opened state, adjust the torque of the powerplant to a first value to accelerate the vehicle at the desired magnitude. The controller is further programmed to, in response to the request to accelerate the vehicle at the desired magnitude and the torque converter bypass clutch being in the closed state, adjust the torque of the powerplant to a second value to accelerate the vehicle at the desired magnitude. The controller is further programmed to, in response to the request to accelerate the vehicle at the desired magnitude and the torque converter bypass clutch being in the slipping state, adjust the torque of the powerplant to a third value to accelerate the vehicle at the desired magnitude.

A vehicle includes a drive wheel, an engine, an accelerator pedal, a torque converter, a clutch, and a controller. The drive wheel is configured to propel the vehicle. The engine is configured to generate power and to deliver power to the drive wheel to accelerate the vehicle. The accelerator pedal is configured to generate an acceleration request based on a pedal position. The torque converter is disposed between the engine and the drive wheel. The clutch is disposed between the engine and the drive wheel and is configured to bypass the torque converter. The controller is programmed to, in response to depressing the accelerator pedal to a position that corresponds with accelerating the vehicle at a desired magnitude and the clutch being in the opened state, adjust the torque of the engine to a first value to accelerate the vehicle at the desired magnitude. The controller is further programmed to, in response to depressing the accelerator pedal to the position that corresponds with accelerating the vehicle at the desired magnitude and the torque converter being in the closed state, adjust the torque of the engine to a second value to accelerate the vehicle at the desired magnitude.

A vehicle includes a drive wheel, an engine, an accelerator pedal, a torque converter, a clutch, and a controller. The drive wheel is configured to propel the vehicle. The engine is configured to generate power and to deliver power to the drive wheel to accelerate the vehicle. The accelerator pedal is configured to generate an acceleration request based on a pedal position. The torque converter is disposed between the engine and the drive wheel. The clutch is disposed between the engine and the drive wheel and is configured to bypass the torque converter. The controller is programmed to, in response to depressing the accelerator pedal to a position that corresponds with accelerating the vehicle at a desired magnitude and the clutch being in the opened state, adjust the torque of the engine to a first value to accelerate the vehicle at the desired magnitude. The controller is further programmed to, in response to depressing the accelerator pedal to the position that corresponds with accelerating the vehicle at the desired magnitude and the torque converter being in the slipping state, adjust the torque of the engine to a second value to accelerate the vehicle at the desired magnitude.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
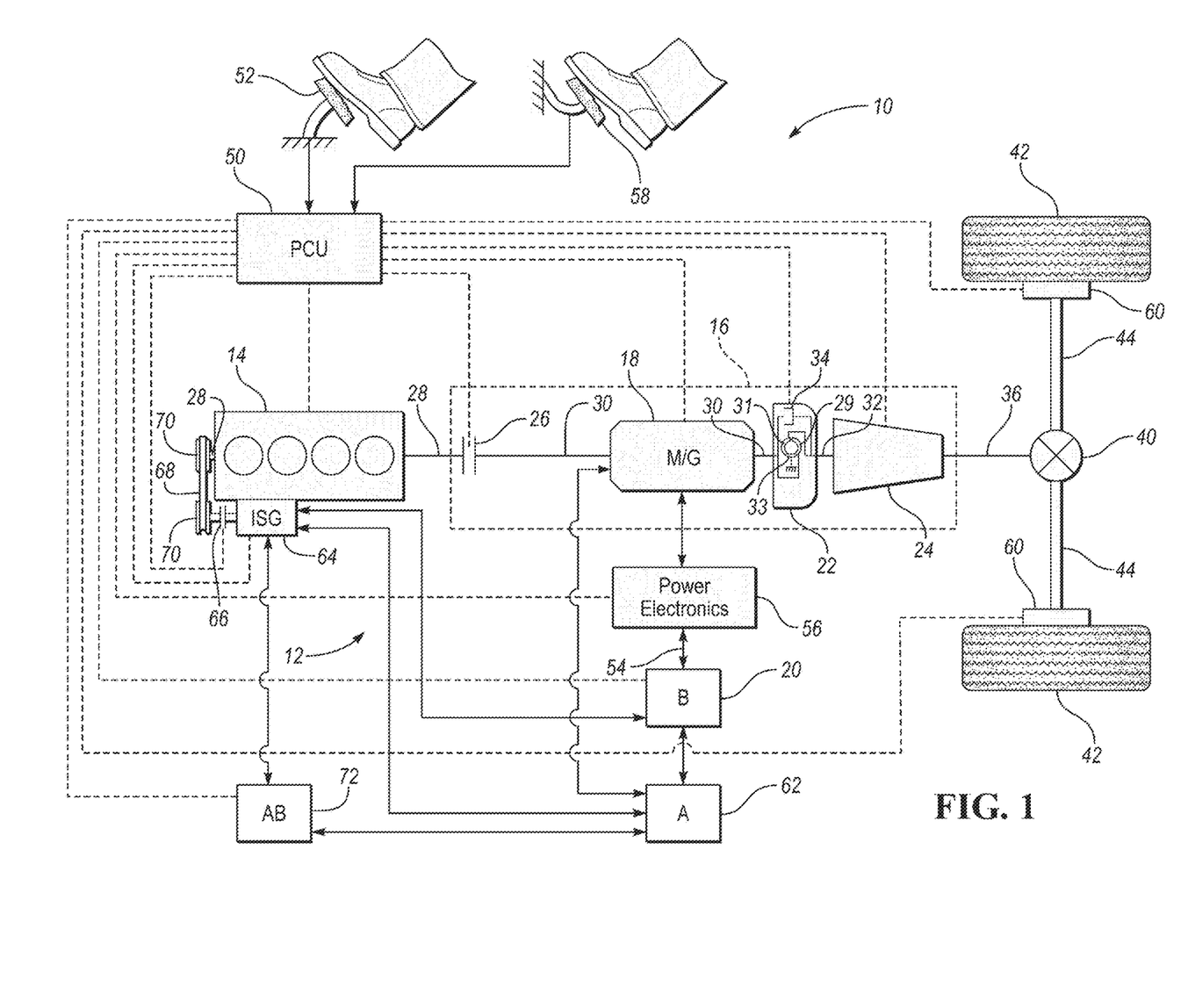
FIG. 1 is a schematic illustration of a representative powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24. The powertrain 12 includes power generating components (i.e., engines or electric motors) and the drivetrain. The drivetrain is the group of components that deliver power to the driving wheels, excluding the power generating components. In contrast, the powertrain 12 is considered to include both the power generating components and the drivetrain.

The engine 14 and the M/G 18 are both drive sources or powerplants for the HEV 10 that are configured to propel the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller 29 fixed to M/G shaft 30, a turbine 31 fixed to a transmission input shaft 32, and a stator 33 that is grounded such that it does not rotate. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be configured to transition between an opened (or disconnected) state, a closed (or locked) state, and a slipping state. The rotation of the impeller 29 and the turbine 31 are synchronized when the torque converter bypass clutch 34 is in the closed or locked state. The rotation of the impeller 29 and the turbine 31 are non-synchronized when the torque converter bypass clutch 34 is in the opened state or the slipping state The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example. In another alternative embodiment, the M/G 18 may be disposed between the gearbox 24 and the differential 40. In such an alternative embodiment, where the M/G 18 is disposed between the gearbox 24 and the differential, one or more launch clutches or a torque converter may be disposed between the engine and the gearbox 24.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine power and/or torque through the disconnect clutch 26 to the M/G 18, and then from the M/G 18 to shaft 30 (i.e., the impeller of the torque converter 22) and through the torque converter 22 and gearbox 24. The M/G 18 may assist the engine 14 by providing additional power and/or torque to turn the shaft 30 (i.e., the impeller of the torque converter 22). This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative power and/or torque to the shaft 30 (i.e., the impeller of the torque converter 22). This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

The battery 20 and the M/G 18 may also be configured to provide electrical power to one or more vehicle accessories 62. The vehicle accessories 62 may include, but are not limited to, air conditioning systems, power steering systems, electric heaters, or any other system or device that is electrically operated.

An integrated starter-generator (ISG) 64 may be coupled to the engine 14 (i.e., may be coupled to the crankshaft 28 of the engine 14). The ISG 64 may be configured to operate as a motor to start the engine 14 during an engine start-up event, or to provide additional torque to the powertrain 12 during vehicle operations. The ISG 64 may also be configured to receiving torque from the engine 14 and operate as a generator. The ISG 64 may be selectively coupled to the engine by a clutch 66, belt 68, and a pair of pulleys 70. If the ISG 64 is coupled to the engine by a belt 68 it may be referred to as a belt integrated starter-generator (BISG). The controller 50 may be configured to transmit signals to the ISG 64 to operate the ISG 64 as either a motor or a generator. The controller may also be configured to transmit signals to the clutch 66 in order to open or close the clutch 66. The ISG 64 will be coupled to the engine 14 when the clutch is in a closed state and decoupled from the engine 14 when the clutch 66 is in an opened state. The ISG 64 may be configured to provide electrical energy to charge an accessory battery 72, the traction battery 20, or provide electrical energy to power the vehicle accessories 62 when operating as a generator. The accessory battery 72 may also be configured to power the vehicle accessories 62.

The controller 50 may be configured to receive various states or conditions of the various vehicle components illustrated in FIG. 1 via electrical signals. The electrical signals may be delivered to the controller 50 from the various components via input channels. Additionally, the electrical signals received from the various components may be indicative of a request or a command to change or alter a state of one or more of the respective components of the vehicle 10. The controller 50 includes output channels that are configured to deliver requests or commands (via electrical signals) to the various vehicle components. The controller 50 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the schematic illustrated in FIG. 1 is merely representative and is not intended to be limiting. Other configurations are contemplated that utilize selective engagement of both an engine and a motor to transmit power through the transmission. For example, the M/G 18 may be offset from the crankshaft 28, and/or the M/G 18 may be provided between the torque converter 22 and the gearbox 24. Other configurations are contemplated without deviating from the scope of the present disclosure.

It should also be understood that the vehicle configuration described herein is merely exemplary and is not intended to be limited. Other non-hybrid, electric, or hybrid vehicle configurations should be construed as disclosed herein. Other vehicle configurations may include, but are not limited to, vehicles powered by an engine only, micro-hybrid vehicles, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

The translation of the driver pedal input into a torque demand may be been carried out in the transmission input domain. In powertrains that include torque converter based automatic transmissions, the translation of the driver pedal input into a torque demand at the transmission input may also account for an inertia compensation, which refers to the torque required to compensate for the fluid dynamics of the torque converter, when a bypass clutch of the torque converter is operating in the opened state or slipping state. If the inertia compensation is not included in the torque demand at the transmission input, then the response of the driveline may feel sluggish, particularly when the torque converter bypass clutch is operating in the opened state. The torque converter bypass clutch may be operating in the opened state, for example, during a vehicle launch from a zero speed or a standstill condition. Also, if the inertia compensation is not included in the torque demand at the transmission input, then the powertrain may exhibit a torque hole (i.e., transient reduction in torque), during a transition of the torque converter bypass clutch from a closed or locked state to the opened or slipping state.

Figure 2:
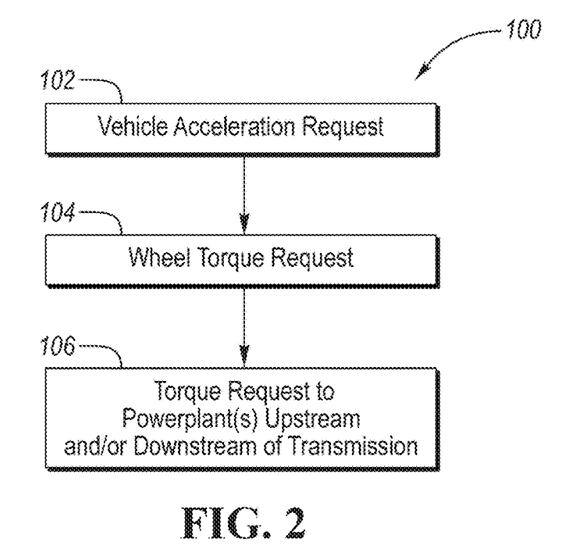
FIG. 2 is a flowchart illustrating a translation of a vehicle acceleration request into torque requests to one or more vehicle powerplants.

Referring to FIG. 2, a flowchart 100 of a translation of a vehicle acceleration request or demand into a torque request to one or more vehicle powerplants (e.g., engine 14 or M/G 18) is illustrated. The vehicle acceleration request is generated at block 102. The vehicle acceleration request may be based on an accelerator pedal input (i.e., the vehicle operator depressing the accelerator pedal 52 to a specific pedal position). Such an acceleration request may be a function of the accelerator pedal position, the current gear of transmission (i.e., the current gear of the transmission gearbox 24), and the vehicle speed. Alternatively, the acceleration request may be a based on a request from an automatic cruise control system or a request from an automated vehicle driving system. The acceleration request is translated into a wheel torque request or demand (i.e., a torque request at one or more drive wheels that are configured to propel the vehicle)

at block 104 based on the physics and configuration of the drivetrain of the vehicle. The wheel torque request is then translated into one or more torque requests to the one or more powerplants (e.g., engine 14 or M/G 18), which may be either upstream or downstream of the transmission (e.g., the transmission may collectively refer to the gearbox 24 and torque converter 22) at block 106. The wheel torque request may be distributed between the one or more powerplants based on the vehicle drive mode (e.g., a performance mode or towing mode) and drivetrain efficiency considerations, such as fuel consumption. An inertia compensation torque request, that is computed based on a dynamic model of the torque converter, is included as part of the torque request for powerplants that are upstream of a torque converter (i.e., powerplants that are configured to input power into a torque converter), when the torque converter bypass clutch is in an opened state (e.g., during a launch of the vehicle or during tip-in in low transmission gear) or slipping state.

Figure 3:
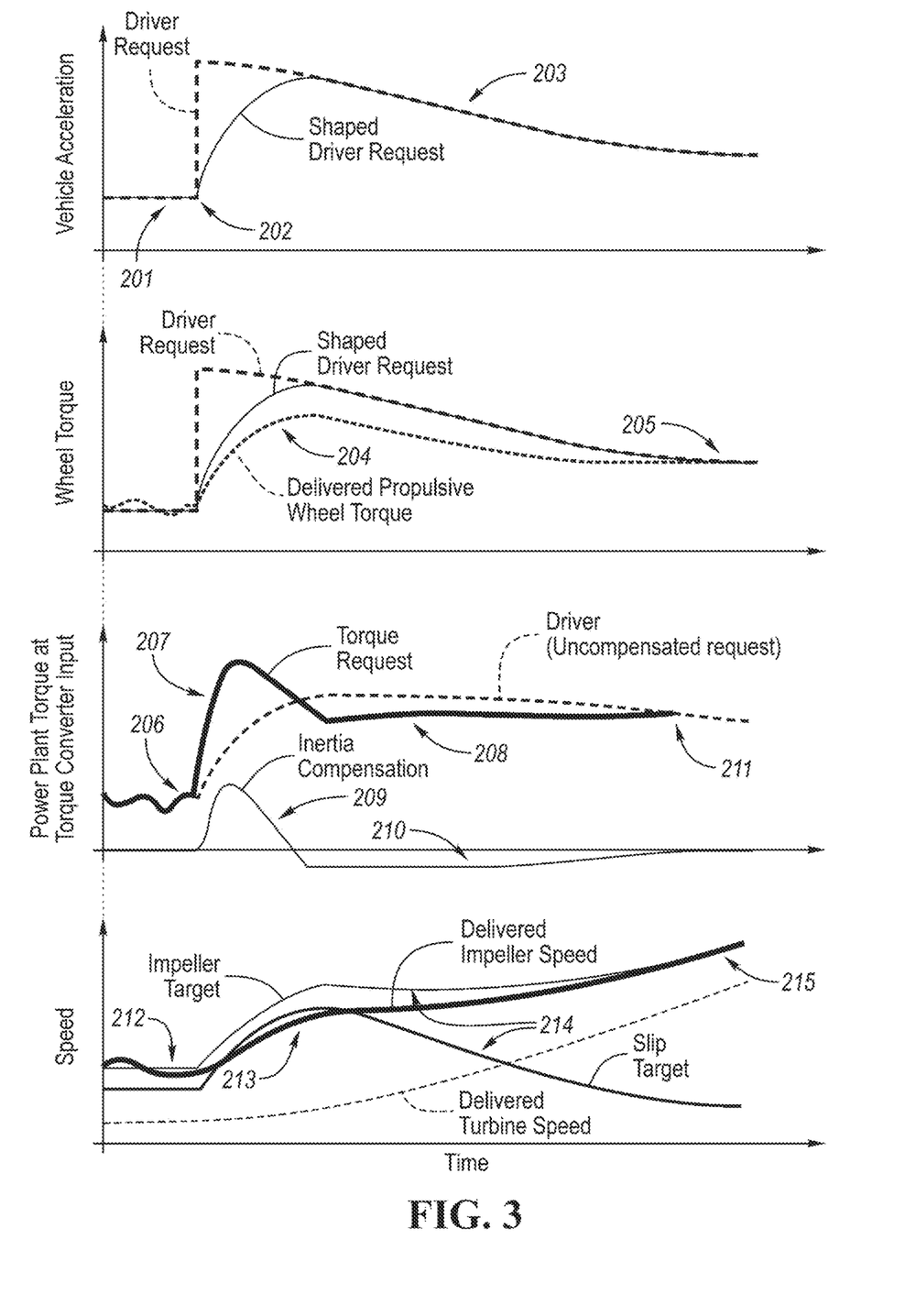
FIG. 3 includes a series of graphs that illustrate the behavior of various vehicle components during a tip-in from a creep scenario.

Referring to FIG. 3, a series of graphs 200 of the behavior of various vehicle components during a tip-in from a creep scenario are illustrated, when the torque converter bypass clutch 34 is operating in the opened state. The vehicle creeps in region 201, and the tip-in takes place in region 202. At the onset of the tip-in, there is a step increase in the vehicle acceleration request. As seen in region 203, the request decreases due to the increase in the vehicle speed. A step increase in the requested vehicle acceleration, when translated to the torque request of a powerplant that inputs power into the torque converter (e.g., engine 14 or M/G 18), results in an infinitely big impulse torque which cannot be delivered by the powerplant. Therefore, the demanded vehicle acceleration is shaped (i.e., filtered or rate limited) to take into account the limitations of the powerplant in delivering torque. The shaped vehicle acceleration is the reference signal to generate the desired powerplant torques.

As seen in region 204, due to the limitations of the powerplant in delivering torque to the wheels, the delivered wheel torque is initially not able to meet the wheel torque request. As indicated in region 205, as time progresses, the delivered wheel torque meets the wheel request. The time taken by the delivered torque to converge to the wheel torque request depends, among other factors, on the time constant and/or rate-limit associated with the torque of the powerplant.

In region 206, variations in the torque request are due to the operation of the powerplant in the speed control mode. This speed control mode is designed to satisfy the vehicle creep torque request. At the onset of the tip-in, the system transitions into a torque control mode. This transition is followed by an increase in the powerplant torque request. As seen in region 207, this request increases above the original driver request due to the addition of the positive-valued inertia compensation torque of region 209. Furthermore, in region 208, the engine torque request goes below the driver request due to the addition of the negative-valued inertia compensation torque of region 210. Note that, as indicated below, the inertia compensation torque becomes negative in region 210 due to the decrease in the target torque converter bypass clutch slip speed. In region 211, the powerplant torque request converges to the driver request.

In region 212, the target impeller speed is a constant value, where this value is calculated based on the desired creep torque. After the system transitions into the torque control mode, the target impeller speed is calculated based on the uncompensated driver torque request and the turbine speed. The difference between the target impeller speed and the target turbine speed is the target torque converter bypass clutch slip speed. Here, the target turbine speed can be obtained based on the desired vehicle acceleration and the torque ratios of the final drive and the transmission gearbox.

In region 213, the impeller speed is not able to meet its target due to the limitations of the powerplant. In region 214, the target impeller speed decreases due to the decrease in the driver torque request. Furthermore, due to this decrease, and due to the increase in the target turbine speed, the torque convert bypass clutch slip target decreases in the same region. When the impeller speed meets the target speed in region 215, the driver wheel torque request is met.

The controller 50 may be programmed (i.e., may include control logic and/or an algorithm) to adjust a torque of one or more powerplants that are configured to input power into the torque converter (e.g., engine 14 or M/G 18) in order to meet a desired acceleration request. More specifically, the controller may be programmed to adjust the torque of the powerplants (e.g., engine 14 or M/G 18) depending on whether the torque converter bypass clutch 34 is in an opened stated, a closed state, or a slipping state. For example, the controller 50 may be programmed to, in response to a request to accelerate the vehicle 10 at a desired magnitude, adjust the torque of a powerplant (e.g., engine 14 or M/G 18) that is configured to input power into the torque converter 22 to a first value to accelerate the vehicle 10 at the desired magnitude if the torque converter bypass clutch 34 is in the opened state, adjust the torque of the powerplant to a second value to accelerate the vehicle 10 at the desired magnitude if the torque converter bypass clutch 34 is in the closed state, and adjust the torque of the powerplant to a third value to accelerate the vehicle 10 at the desired magnitude if the torque converter bypass clutch 34 is in the slipping state. This ensures that the vehicle accelerates at a desired magnitude by adjusting the torque of the powerplant that is configured to input power into the torque converter 22 depending on whether the torque converter bypass clutch is in the opened state, closed state, or slipping state.

In order to translate a desired vehicle acceleration, $a_{veh,dd}$, into the torque of the powerplant (e.g., engine 14 or M/G 18) that is configured to input power into the torque converter 22, the propulsive torque request at the wheels must be determined and may be expressed as equation (1):

$$Tq_{whl,dd}(t) = m_{veh} R_{whl} a_{veh,dd}(t) + Tq_{road\ load}(t) \quad (1)$$

where $Tq_{whl,dd}(t)$ is the propulsive torque request at the wheels 42 as a function of time, $m_{veh}$ is the estimated/measured vehicle mass, which accounts for the static mass of the vehicle, passengers, and cargo, the inertias of the wheels 42, and the inertias of the half-shafts 44; $Tq_{road\ load}$ (0 is the estimate of the resistive load on the vehicle as a function of time, which accounts for tire drag forces, tow load, aerodynamic drag forces, and road grade; and $R_{whl}$ the radius of the drive wheels 42.

The torque of the powerplant (e.g., engine 14 or M/G 18) that is configured to input power into the torque converter 22 projected to the wheel domain $Tq_{whl,pp}(t)$ as a function of time may be expressed as equation (2):

$$Tq_{whl,pp}(t) = Tq_{whl,dd}(t) + rt_{fd} rt_{gearbox} rt^*_{TC}(t) J_{TrnAin} \frac{d\omega^*_{im}(t)}{dt} \quad (2)$$

where $J_{TrnAin}$ is the inertia of the rotating components of the drivetrain at the input side of the torque converter (e.g., this may be the sum of engine inertia—if an engine is utilized, motor inertia—if a motor is utilized, impeller inertia, flywheel inertia, inertia of a torque damper on the crankshaft, etc.), $rt_{fd}$ is the torque ratio of the final drive, $rt_{gearbox}$ is the torque ratio of the transmission gearbox 24, $rt_{TC}^*$ is the target torque ratio of the torque converter 22, and $\omega_{im}^*$ is the target speed of the impeller 29.

The torque demand as a function of time projected to turbine domain of the torque converter $Tq_{tu,dd}$ (t) may be expressed as equation (3):

$$Tq_{tu,dd}(t) = \frac{Tq_{whl,dd(t)}}{rt_{fd}rt_{gearbox}} \tag{3}$$

Figure 4:
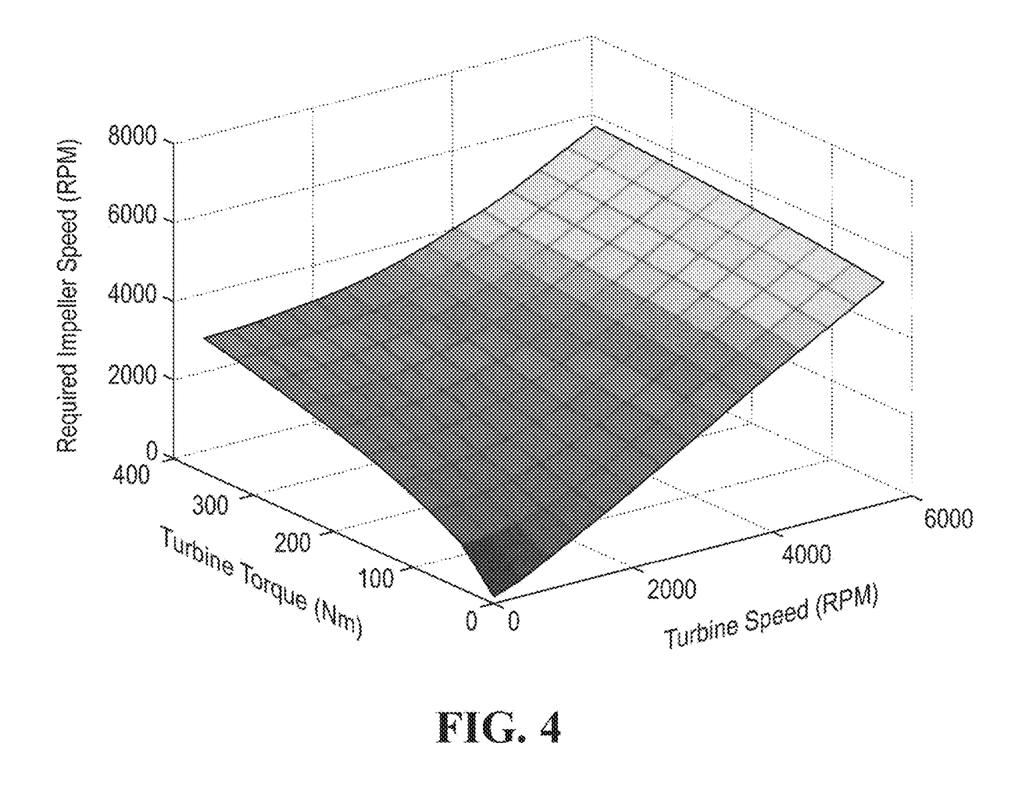
FIG. 4 is a surface graph illustrating the relationship between turbine speed, turbine torque, and impeller speed within a torque converter.

If the torque converter bypass clutch 34 is in the opened state, then the target impeller speed $\omega_{im}^*$ and the target torque ratio of the torque converter $rt_{TC}^*$ can be expressed as the following relationship (4):

$$\omega_{im}^*(t) = \mathcal{F}_1(\omega_{tu}(t), Tq_{tu,dd}(t)), \; rt_{TC}^*(t) = \mathcal{F}_2\left(\frac{\omega_{tu}(t)}{\omega_{im}^*(t)}\right) \tag{4}$$

where $\omega_{tu}$, is the turbine speed and $\mathcal{F}_1$ (•) and $\mathcal{F}_2$ (•) are maps that characterize the dynamic model of the fluid path of the torque converter 22. An example of such a map is illustrated in FIG. 4. Such maps are obtained from tests carried out on the hardware of the torque converter 22 and stored within the controller 50.

Utilizing equation (2), the demanded torque of the powerplant (e.g., engine 14 or M/G 18) that is configured to input power into the torque converter 22 can be projected to the domain that corresponds to the input to the transmission (i.e., the torque converter 22 itself being the input to the transmission or more specifically at the impeller 29 of the torque converter 22 being the input to the transmission) and may be expressed as equation (5):

$$Tq_{TrnAin,dd}(t) = \frac{\frac{Tq_{whl,dd}(t)}{rt_{fd}rt_{gearbox}} - Tq_{TCC}}{rt_{TC}^*(t)} + Tq_{TCC} \tag{5}$$

where $Tq_{TrnAin,dd}(t)$ is the demanded torque of the powerplant (e.g., engine 14 or M/G 18) that is configured to input power into the torque converter 22 projected to the domain that corresponds to the input to the transmission as a function of time and $Tq_{TCC}$ (t) is the estimated torque applied by the torque converter bypass 34 clutch. If the torque converter bypass clutch 34 is in a closed state, the target torque ratio of the torque converter $rt_{TC}^*$ will have a value of one when utilizing equation (5) to determine the demanded torque of the powerplant (e.g., engine 14 or M/G 18) that is configured to input power into the torque converter 22.

The target impeller speed as described in equation (4) and represented in FIG. 4 may be difficult to bound within the capabilities of a given torque converter 29. Therefore, the solution described by equations (1) to (5) may be reformulated to be based on target slip across the torque converter, a quantity which may be easier to bound since the current turbine speed is measurable. The reformulation of the solution is described in equations (6)-(11). Please note that all of the equations or relationships described herein may be stored as control logic and/or an algorithm within and executed by the controller 50.

The target turbine acceleration $$\frac{d\omega_{tu}^*}{dt}$$

may be expressed as equation (6):

$$\frac{d\omega_{tu}^*(t)}{dt} = \frac{rt_{fd}rt_{gearbox}a_{veh,dd}}{R_{whl}} \tag{6}$$

Utilizing above Equation (6), the driver wheel torque request $Tq_{whl,dd}$ from equation (2) can be rewritten as equation (7):

$$Tq_{whl,pp}(t) = Tq_{road\;load}(t) + m_{veh,eff}(t)a_{veh,dd} + \tag{7}$$
$$rt_{fd}rt_{gearbox}rt_{TC}^*(t)J_{TrnAin}\left[\frac{d\omega_{im}^*(t)}{dt} - \frac{d\omega_{tu}^*(t)}{dt}\right]$$

where $m_{veh,eff}$ is the effective mass of the vehicle.

The effective mass of the vehicle $m_{veh,eff}$ may be expressed as equation (8):

$$m_{veh,eff}(t) = \frac{m_{veh}R_{whl}^2 + J_{TrnAin}rt_{fd}^2rt_{gearbox}^2rt_{TC}^{*2}(t)}{R_{whl}^2} \tag{8}$$

The demanded torque of the powerplant (e.g., engine 14 or M/G 18) that is configured to input power into the torque converter 22 projected to the domain that corresponds to the input to the transmission may be expressed as a sum of two components and expressed as equation (9):

$$Tq_{TrnAin,dd}(t) = Tq_{TrnAin,dd,uncomp}(t)Tq_{TrnAin,comp}(t), \tag{9}$$

where $Tq_{TrnAin,dd,uncomp}$ is the uncompensated torque request and $Tq_{TrnAin,comp}$ is the inertia compensated torque request.

The uncompensated torque request $Tq_{TrnAin,dd,uncomp}$ and the inertia compensation torque request $Tq_{TrnAin,comp}$ may be expressed as functions of time via equations (10) and (11), respectively:

$$Tq_{TrnAin,dd,uncomp}(t) = \tag{10}$$
$$\frac{\frac{Tq_{road\;load}(t) + m_{veh,eff}(t)a_{veh,dd}(t)}{rt_{fd}rt_{gearbox}} - Tq_{TCC}}{rt_{TC}^*(t)} * + Tq_{TCC}$$

$$Tq_{TrnAin,comp}(t) = J_{TrnAin}\left[\frac{d\omega_{im}^*(t)}{dt} - \frac{d\omega_{tu}^*(t)}{dt}\right]. \tag{11}$$

The compensated torque $Tq_{TrnAin,comp}(t)$ is referred to as 'slip-based,' since it involves the time-derivative of the target torque converter bypass clutch slip speed. As one may expect, if the target slip speed bypass clutch increases, then $Tq_{TrnAin,comp}$ takes a positive value (e.g., region 209 of FIG. 3), and if the target slip speed bypass clutch decreases, then $Tq_{TrnAin,comp}$ takes a negative value (e.g., region 210 of FIG. 3).

The presence of various noise factors, such as uncertainty in the value of $J_{TrnAin}$ and error in the delivered torque of the of the powerplant, may affect the response of the vehicle relative to the acceleration request. Moreover, the vehicle response to the same "open-loop" driver request of Equation (9) may also be sluggish. Therefore, in order to increase robustness of the system to these noise factors and also improve the transient response of the vehicle, an additional feedback correction torque request, based on the difference between the target impeller speed and the measured impeller speed, in the driver demand may be utilized. Such a feedback control could be added to equation (9), which is rewritten as equation (12):

$$Tq_{TrnAin,dd}(t)=Tq_{TrnAin,dd,uncomp}(t)Tq_{TrnAin,comp}(t)P_{gain}(t)(\omega_{im}^*(t)-\omega_{im}(t)) \quad (12)$$

where $P_{gain}(t)(\omega_{im}^*(t)-\omega_{im}(t))$ is the feedback control, $P_{gain}(t)$ is gain term that may be calibrated as a function of the aggressiveness of the tip-in and/or the operating conditions of the vehicle, e.g., speed, drive mode, transmission gear, etc.; $\omega_{im}^*(t)$ is the target impeller speed; and $\omega_{im}(t)$ is the measured impeller speed.

The gain term $P_{gain}(t)$ is shown to be a proportional term. However, it should be understood that the feedback could take the form of a linear quadratic regulator (LQR), a model-predictive controller (MPC), a proportional-integral-differential (PID) controller, or any other type of controller known in the art.

The methodology described above proposes the use of estimates of various modeled powertrain parameters so that, if these parameters change or evolve over time, the demanded torque can adapt to these changes and provide a consistent response performance for a given driver input.

Factors like number of passengers and cargo affect the vehicle mass. If the mass of the vehicle is estimated using onboard sensors, the described methodology in the equations described herein allows for the adaptation of the driver demand torque to variations in vehicle mass. For example, if the mass of the vehicle were to increase due to additional passengers, the above equations could be utilized to adjust the torque of the powerplants based on the change in the vehicle mass to ensure that the desired vehicle acceleration is obtained.

Also, changing the tire size is a common vehicle modification or may occur as the tread of the tire wears out. Again, the described methodology in the equations described herein allows for a consistency in desired vehicle acceleration by adapting the driver demand torque to changes in tire size. Such changes in tire size may be programmed into the controller during a tire change service or may be determined based on the relationship between the speed of the vehicle and the rotation rate of the tires. Similarly, aftermarket changes to gear ratios in the final drive box (e.g., gearbox 24) can be adapted according the equations described herein.

The use of onboard sensors makes it possible to estimate changes in road grade or a towing load. These estimated changes in road grade or towing load can be also be used to adapt the driver demand torque according to the equations described herein to allow for a consistency in desired vehicle acceleration by adapting the demand torque to the changes in road grade or tow load.

Figure 5:
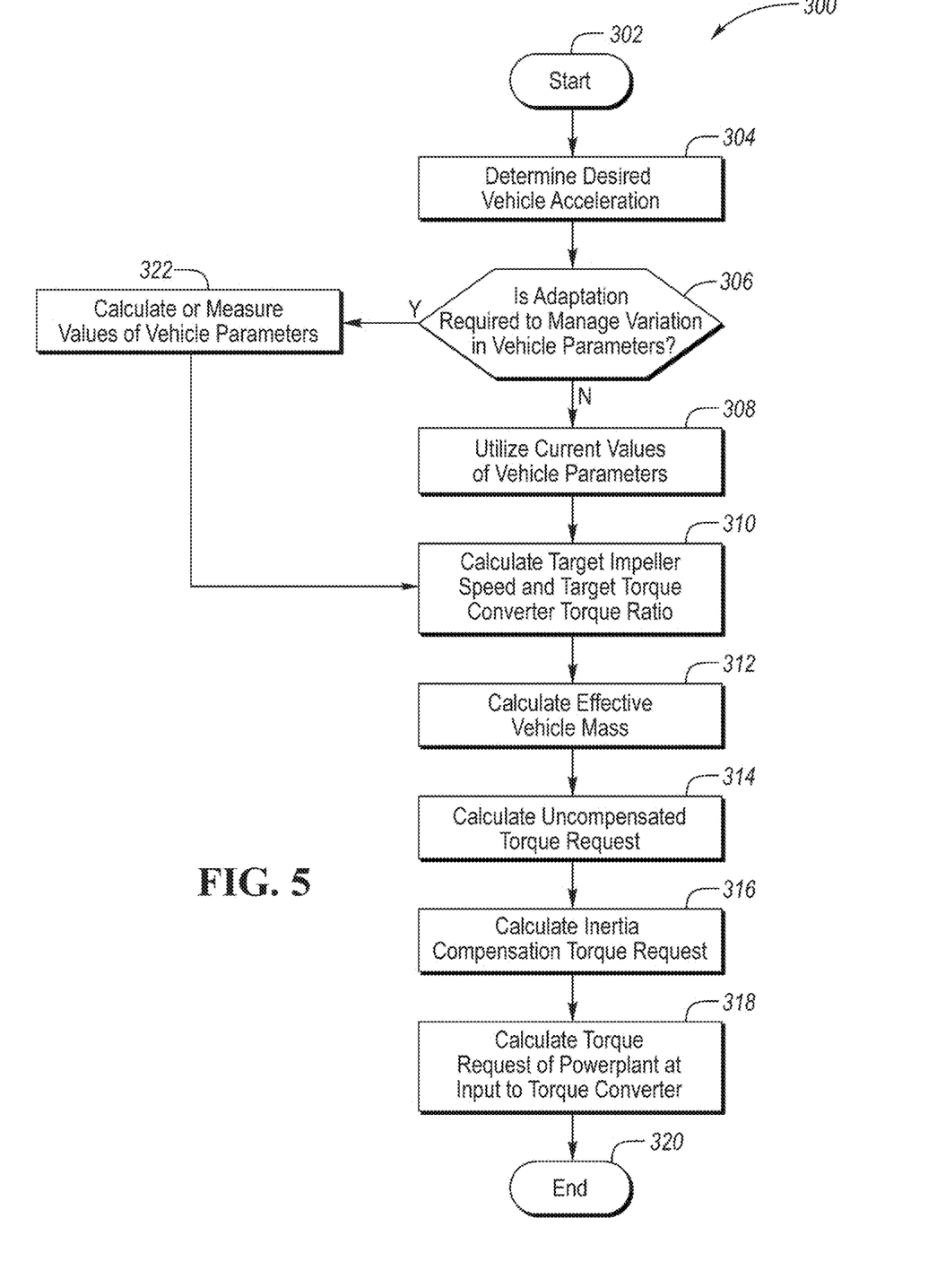
FIG. 5 is a flowchart illustrating a method of adapting or adjusting a torque command of a vehicle powerplant that is upstream of a torque converter in order to obtain a desired vehicle acceleration.

Referring to FIG. 5, a flowchart of a method 300 of adapting or adjusting a torque command of a vehicle powerplant that is upstream of a torque converter in order to obtain a desired vehicle acceleration is illustrated. The method 300 may be stored and control logic and/or an algorithm within the controller 50. The method 300 may utilize the equations and relationships describe herein to adjust the torque of the vehicle powerplants to obtain desired a vehicle acceleration. The method 300 begins at start block 302. Next, the method 300 moves on to block 304 where the desired vehicle acceleration $a_{veh,dd}$ is determined.

Once the desired vehicle acceleration $a_{veh,dd}$ is determined, the method 300 moves on to block 306 where it is determined if adaptation is required to manage variations in vehicle parameters, such a change in the state (i.e., opened, closed, or slipping) of the torque converter bypass clutch 34; a change in a gradient of the surface that the vehicle 10 is traveling on; a change in a radius of the wheels 42 or tires of the vehicle 10; a change in a gear ratio between the input and output of the gear box 24; a change in a cargo load within the vehicle and/or overall mass of the vehicle; a change in a tow load being exerted on the vehicle; etc.

If an adaptation is not required, the method moves on to block 308 where the current values of the vehicle parameters are utilized. The Current values are then utilized and input into the equations described herein to calculate the target impeller speed $\omega_{im}^*$ and the target torque converter torque ratio $rt_{TC}^*$ at block 310, calculate the effective vehicle mass $m_{veh,eff}$ at block 312, calculate the uncompensated torque request $Tq_{TrnAin,dd,uncomp}(t)$ of the vehicle powerplant at block 314, calculate the inertia compensated torque request $Tq_{TrnAin,comp}(t)$ of the vehicle powerplant at block 316, and calculate the demanded torque $Tq_{TrnAin,dd}(t)$ of the vehicle powerplant at block 318 in order to obtain the desired vehicle acceleration $a_{veh,dd}$. The method 300 then ends at block 320.

If an adaptation is required, the method moves on to block 322 where updated values of one or more of the vehicle parameters are calculated or measured. The updated values of the vehicle parameters are then utilized and input into the equations described herein to calculate the target impeller speed $\omega_{im}^*$ and the target torque converter torque ratio $rt_{TC}^*$ at block 310, calculate the effective vehicle mass $m_{veh,eff}$ at block 312, calculate the uncompensated torque request $Tq_{TrnAin,dd,uncomp}(t)$ of the vehicle powerplant at block 314, calculate the inertia compensated torque request $Tq_{TrnAin,comp}(t)$ of the vehicle powerplant at block 316, and calculate the demanded torque $Tq_{TrnAin,dd}(t)$ of the vehicle powerplant at block 318 in order to obtain the desired vehicle acceleration $a_{veh,dd}$. The method 300 then ends at block 320.

It should be understood that the flowchart in FIG. 5 is for illustrative purposes only and that the method 300 should not be construed as limited to the flowchart in FIG. 5. Some of the steps of the method 300 may be rearranged while others may be omitted entirely. It should be further understood that the designations of first, second, third, fourth, etc. for any component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   at least one drive wheel configured to propel the vehicle;
   a torque converter having an impeller and a turbine;
   a torque converter bypass clutch that is configured to transition between an opened stated, a closed state, and a slipping state, wherein rotation of the impeller and the turbine are synchronized when the torque converter bypass clutch is in the closed state, and wherein rotation of the impeller and the turbine are non-synchronized when the torque converter bypass clutch is in the opened state or the slipping state;
   a powerplant configured to generate torque and to transfer torque to the torque converter and the torque converter bypass clutch;
   a drivetrain configured to transfer power from the torque converter and the torque converter bypass clutch to the at least one drive wheel; and
   a controller programmed to,
      in response to a request to accelerate the vehicle at a desired magnitude and the torque converter bypass clutch being in the opened state, adjust the torque of the powerplant to a first value to accelerate the vehicle at the desired magnitude,
      in response to the request to accelerate the vehicle at the desired magnitude and the torque converter bypass clutch being in the closed state, adjust the torque of the powerplant to a second value to accelerate the vehicle at the desired magnitude,
      in response to the request to accelerate the vehicle at the desired magnitude and the torque converter bypass clutch being in the slipping state, adjust the torque of the powerplant to a third value to accelerate the vehicle at the desired magnitude, and
      in response to the request to accelerate the vehicle at the desired magnitude and a change in a gradient of a surface that the vehicle is traveling on, adjust the torque of the powerplant to a fourth value to accelerate the vehicle at the desired magnitude.

2. The vehicle of claim 1 further comprising an accelerator pedal, and wherein the request to accelerate the vehicle at the desired magnitude is based on a position of the accelerator pedal.

3. The vehicle of claim 1, wherein the controller is further programmed to, in response to the request to accelerate the vehicle at the desired magnitude and a change in a radius of the at least one drive wheel, adjust the torque of the powerplant to a fourth value to accelerate the vehicle at the desired magnitude.

4. The vehicle of claim 1 further comprising a gear box disposed between the torque converter and the at least one drive wheel, and wherein the controller is further programmed to, in response to the request to accelerate the vehicle at the desired magnitude and a change in a gear ratio of the gear box, adjust the torque of the powerplant to a fourth value to accelerate the vehicle at the desired magnitude.

5. The vehicle of claim 1, wherein the controller is further programmed to, in response to the request to accelerate the vehicle at the desired magnitude and a change in a cargo load within the vehicle, adjust the torque of the powerplant to a fourth value to accelerate the vehicle at the desired magnitude.

6. The vehicle of claim 1, wherein the controller is further programmed to, in response to the request to accelerate the vehicle at the desired magnitude and a change in a tow load being exerted on the vehicle, adjust the torque of the powerplant to a fourth value to accelerate the vehicle at the desired magnitude.

7. A vehicle comprising:
   a drive wheel configured to propel the vehicle;
   an engine configured to generate power and to deliver power to the drive wheel to accelerate the vehicle;
   an accelerator pedal configured to generate an acceleration request based on a pedal position;
   a torque converter disposed between the engine and the drive wheel;
   a clutch disposed between the engine and the drive wheel and configured to bypass the torque converter; and
   a controller programmed to,
      in response to depressing the accelerator pedal to a position that corresponds with accelerating the vehicle at a desired magnitude and the clutch being in an opened state, adjust the torque of the engine to a first value to accelerate the vehicle at the desired magnitude,
      in response to depressing the accelerator pedal to the position that corresponds with accelerating the vehicle at the desired magnitude and the clutch being in a closed state, adjust the torque of the engine to a second value to accelerate the vehicle at the desired magnitude, and
      in response to depressing the accelerator pedal to the position that corresponds with accelerating the vehicle at the desired magnitude and a change in a radius of the drive wheel, adjust the torque of the engine to a third value to accelerate the vehicle at the desired magnitude.

8. The vehicle of claim 7, wherein the controller is further programmed to, in response to depressing the accelerator pedal to the position that corresponds with accelerating the vehicle at the desired magnitude and the torque converter being in a slipping state, adjust the torque of the engine to a third value to accelerate the vehicle at the desired magnitude.

9. The vehicle of claim 7, wherein the controller is further programmed to, in response to depressing the accelerator pedal to the position that corresponds with accelerating the vehicle at the desired magnitude and a change in a gradient of a surface that the vehicle is traveling on, adjust the torque of the engine to a third value to accelerate the vehicle at the desired magnitude.

10. The vehicle of claim 7 further comprising a gear box disposed between the torque converter and the drive wheel, and wherein the controller is further programmed to, in response to depressing the accelerator pedal to the position that corresponds with accelerating the vehicle at the desired magnitude and a change in a gear ratio of the gear box, adjust the torque of the engine to a third value to accelerate the vehicle at the desired magnitude.

11. The vehicle of claim 7, wherein the controller is further programmed to, in response to depressing the accelerator pedal to the position that corresponds with accelerating the vehicle at the desired magnitude and a change in a cargo load within the vehicle, adjust the torque of the engine to a third value to accelerate the vehicle at the desired magnitude.

12. The vehicle of claim 7, wherein the controller is further programmed to, in response to depressing the accelerator pedal to the position that corresponds with accelerating the vehicle at the desired magnitude and a change in a tow load being exerted on the vehicle, adjust the torque of the engine to a third value to accelerate the vehicle at the desired magnitude.

13. A vehicle comprising:
- a drive wheel configured to propel the vehicle;
- an engine configured to generate power and to deliver power to the drive wheel to accelerate the vehicle;
- an accelerator pedal configured to generate an acceleration request based on a pedal position;
- a torque converter disposed between the engine and the drive wheel;
- a clutch disposed between the engine and the drive wheel and configured to bypass the torque converter; and
- a controller programmed to,
  - in response to depressing the accelerator pedal to a position that corresponds with accelerating the vehicle at a desired magnitude and the clutch being in an opened state, adjust the torque of the engine to a first value to accelerate the vehicle at the desired magnitude,
  - in response to depressing the accelerator pedal to the position that corresponds with accelerating the vehicle at the desired magnitude and the torque converter being in a slipping state, adjust the torque of the engine to a second value to accelerate the vehicle at the desired magnitude, and
  - in response to depressing the accelerator pedal to the position that corresponds with accelerating the vehicle at the desired magnitude and a change in a cargo load within the vehicle, adjust the torque of the engine to a third value to accelerate the vehicle at the desired magnitude.

14. The vehicle of claim 13, wherein the controller is further programmed to, in response to depressing the accelerator pedal to the position that corresponds with accelerating the vehicle at the desired magnitude and the clutch being in a closed state, adjust the torque of the engine to a third value to accelerate the vehicle at the desired magnitude.

15. The vehicle of claim 13, wherein the controller is further programmed to, in response to depressing the accelerator pedal to the position that corresponds with accelerating the vehicle at the desired magnitude and a change in a gradient of a surface that the vehicle is traveling on, adjust the torque of the engine to a third value to accelerate the vehicle at the desired magnitude.

16. The vehicle of claim 13 further comprising a gear box disposed between the torque converter and the drive wheel, and wherein the controller is further programmed to, in response to depressing the accelerator pedal to the position that corresponds with accelerating the vehicle at the desired magnitude and a change in a gear ratio of the gear box, adjust the torque of the engine to a third value to accelerate the vehicle at the desired magnitude.

17. The vehicle of claim 13, wherein the controller is further programmed to, in response to depressing the accelerator pedal to the position that corresponds with accelerating the vehicle at the desired magnitude and a change in a tow load being exerted on the vehicle, adjust the torque of the engine to a third value to accelerate the vehicle at the desired magnitude.

* * * * *